(12) United States Patent
Sartori

(10) Patent No.: US 11,072,121 B2
(45) Date of Patent: Jul. 27, 2021

(54) DOUBLE-SKIN ADDITIVE MANUFACTURING MACHINE

(71) Applicant: AddUp, Cebazat (FR)

(72) Inventor: Jean-Francois Sartori, Cebazat (FR)

(73) Assignee: AddUp, Cebazat (FR)

( * ) Notice: Subject to any disclaimer, the term of this patent is extended or adjusted under 35 U.S.C. 154(b) by 0 days.

(21) Appl. No.: 16/349,013

(22) PCT Filed: Nov. 7, 2017

(86) PCT No.: PCT/EP2017/078469
§ 371 (c)(1),
(2) Date: May 10, 2019

(87) PCT Pub. No.: WO2018/087088
PCT Pub. Date: May 17, 2018

(65) Prior Publication Data
US 2019/0270250 A1    Sep. 5, 2019

(30) Foreign Application Priority Data

Nov. 10, 2016  (FR) ...................................... 1660922

(51) Int. Cl.
*B29C 64/153*    (2017.01)
*B29C 64/25*    (2017.01)
(Continued)

(52) U.S. Cl.
CPC ............ *B29C 64/371* (2017.08); *B22F 12/00* (2021.01); *B29C 64/153* (2017.08); *B29C 64/25* (2017.08);
(Continued)

(58) Field of Classification Search
None
See application file for complete search history.

(56) References Cited

U.S. PATENT DOCUMENTS

2002/0090313 A1    7/2002  Wang et al.
2008/0131546 A1    6/2008  Perret et al.
(Continued)

FOREIGN PATENT DOCUMENTS

CN         104963439 A     10/2015
DE    10 2010 052 206 A1    5/2012
(Continued)

OTHER PUBLICATIONS

International Search Report dated Jan. 9, 2018, in corresponding PCT/EP2017/078469 (6 pages).
(Continued)

*Primary Examiner* — Marc C Howell
*Assistant Examiner* — John J DeRusso
(74) *Attorney, Agent, or Firm* — Venable LLP

(57) ABSTRACT

An additive manufacturing machine (10) comprises: a manufacturing chamber (12), the manufacturing chamber being formed by at least one working plane (20), a front wall (22), a rear wall (24), a left-hand lateral wall (26), a right-hand lateral wall, and an upper wall (30), at least one of these walls supporting a source of energy or heat (14); an inner skin (32) that is positioned inside the manufacturing chamber (12) in front of each wall of this chamber supporting the source of energy or heat (14) and at a non-zero distance from these walls so as to create a circulation volume (V) for a flow of gas (F); and a device (52) for generating the flow of gas (F) that is connected to the circulation volume (V).

9 Claims, 3 Drawing Sheets

(51) Int. Cl.
*B29C 64/364* (2017.01)
*B22F 12/00* (2021.01)
*B33Y 30/00* (2015.01)
*B33Y 40/00* (2020.01)
*B29C 64/371* (2017.01)
*B29C 64/295* (2017.01)
*B33Y 10/00* (2015.01)
*B22F 10/10* (2021.01)

(52) U.S. Cl.
CPC .......... *B29C 64/295* (2017.08); *B29C 64/364* (2017.08); *B22F 10/10* (2021.01); *B22F 2999/00* (2013.01); *B33Y 10/00* (2014.12); *B33Y 30/00* (2014.12); *B33Y 40/00* (2014.12); *Y02P 10/25* (2015.11)

(56) References Cited

U.S. PATENT DOCUMENTS

| | | | |
|---|---|---|---|
| 2016/0101469 A1* | 4/2016 | Kawada | B22F 3/1007 |
| | | | 425/78 |
| 2016/0214175 A1* | 7/2016 | Nordstrom | B29C 64/364 |
| 2017/0087635 A1 | 3/2017 | Wilkes et al. | |
| 2017/0282245 A1* | 10/2017 | Yasuda | B29C 64/153 |
| 2018/0043614 A1* | 2/2018 | Greenfield | B29C 64/205 |
| 2018/0126650 A1* | 5/2018 | Murphree | B29C 64/371 |
| 2018/0318927 A1* | 11/2018 | Baumann | B33Y 30/00 |
| 2018/0369910 A1* | 12/2018 | Gunther | B22F 3/1055 |

FOREIGN PATENT DOCUMENTS

| | | |
|---|---|---|
| EP | 3 147 047 A1 | 3/2017 |
| FR | 2 385 060 A1 | 10/1978 |
| JP | 2012-117679 A | 6/2012 |

OTHER PUBLICATIONS

French Search Report dated Jul. 14, 2017, in corresponding FR 1660922 (7 pages).

* cited by examiner

DOUBLE-SKIN ADDITIVE MANUFACTURING MACHINE

BACKGROUND

The invention lies in the field of powder-based additive manufacturing by melting grains of this powder with the aid of a source of energy or of heat, such as a laser beam, a beam of electrons, or diodes, for example.

More specifically, the invention aims to allow the manufacturing of better quality components.

The use of melting to manufacture components brings about residual stresses in the manufactured components, which can result in defects in the manufactured components or even the breakage of certain parts of the manufactured components.

When the manufactured components have defects, they are scrapped and represent a loss for the manufacturer. Moreover, new components have to be produced to meet the needs of the client who has ordered these components.

On the other hand, when a part of a manufactured component breaks under the effect of the residual stresses, it is no longer possible to continue manufacturing it. Specifically, since it is generally the base of the component which is secured to the additive manufacturing plate that gives way, the component is no longer held fixedly in the manufacturing frame of reference of the machine.

Furthermore, in the context of additive manufacturing by depositing a bed of powder, the defective component which is no longer secured to the additive manufacturing plate can move and damage the scraper or the roller of the device for distributing the powder over the working zone.

Since significant residual stresses arise when large temperature gradients exist between the base of the component, secured to the additive manufacturing plate, and the cross section of the component being manufactured, it is known practice to use manufacturing plates that heat up or are heated by another device in order to reduce the temperature gradient between the base of the component, secured to the additive manufacturing plate, and the cross section of the component being manufactured.

While the use of plates that heat up or are heated makes it possible to control the occurrence of residual stresses, it nevertheless has drawbacks.

Specifically, the heat of the plate is transmitted to the manufactured components but also to the unconsolidated powder surrounding them. Therefore, a significant quantity of heat radiates from the working surface inside the manufacturing chamber of the additive manufacturing machine.

Furthermore, this radiating heat heats up all the parts of the additive manufacturing machine that surround the manufacturing chamber. Notably, this radiating heat is likely to heat up parts of the frame of the machine supporting the source(s) of energy or heat used to melt the grains of powder and the means used to direct and move this/these source(s) of energy or heat over the bed of powder. On heating, these parts of the frame of the machine deform and cause the source of energy or heat to shift, reducing the precision of manufacturing and thus the quality of the manufactured components.

Moreover, such deformations of the frame can also cause sealing problems, and thus dangerous leaks of powder or of inert gas. Specifically, additive manufacturing powders can contain chemical compounds or metals that are toxic. In addition, since the manufacturing chambers of additive manufacturing machines are filled with inert gas in order to avoid the oxidation of certain additive manufacturing powders and the risks of explosion associated with the oxidation of some of these oxidizable powders, in the event of a leak, the inert gas expands around the machine and the operators present in the workshop where the machine is installed may experience a lack of oxygen.

Finally, the heat radiating from the working zone also causes an increase in the temperature inside the additive manufacturing chamber, and this can result in crystallization of the powder, which is to the detriment of the quality of the bed of powder and thus to the quality of the components manufactured.

Therefore, the objective of the present invention is to protect the parts of the frame of the machine supporting the source(s) of energy or heat used to melt the grains of powder and the means used to direct and move this/these source(s) of energy or heat over the bed of powder from the heat radiating from the working surface, in particular when the working surface is situated above a plate that heats up or is heated by another device.

SUMMARY

To this end, the subject of the invention is an additive manufacturing machine, this additive manufacturing machine comprising a manufacturing chamber inside which at least one source of heat or energy is used to melt additive manufacturing powder on a working surface, the manufacturing chamber being formed by at least one working plane, a front wall, a rear wall, a left-hand lateral wall, a right-hand lateral wall, and an upper wall, at least one of these walls supporting the source of energy or heat used to melt the additive manufacturing powder.

According to the invention, the additive manufacturing machine comprises an inner skin that is positioned inside the manufacturing chamber in front of each wall supporting the source of energy or heat and at a non-zero distance from each wall supporting the source of energy or heat so as to create a circulation volume for a flow of gas between the inner skin and each wall in front of which this inner skin is positioned, and the additive manufacturing machine comprises a device for generating a flow of gas that is connected to the circulation volume.

By virtue of the inner skin and the flow of gas, which cools the inner skin, each wall supporting the source of energy or heat is subjected less to the heat radiating from the working surface and is thus less likely to deform. Thus, the components can be manufactured with precision, and any leaks of powder due to sealing problems of the manufacturing chamber are avoided.

Advantageously, by circulating between the inner skin and the walls of the manufacturing chamber, the flow of air also makes it possible to regulate the temperature in the manufacturing chamber and to avoid crystallization of the powder on the working surface.

BRIEF DESCRIPTION OF THE FIGURES

Further features and advantages of the invention will become apparent from the following description. This description, which is given by way of non-limiting example, refers to the appended drawings, in which.

DETAILED DESCRIPTION

Figure 1:
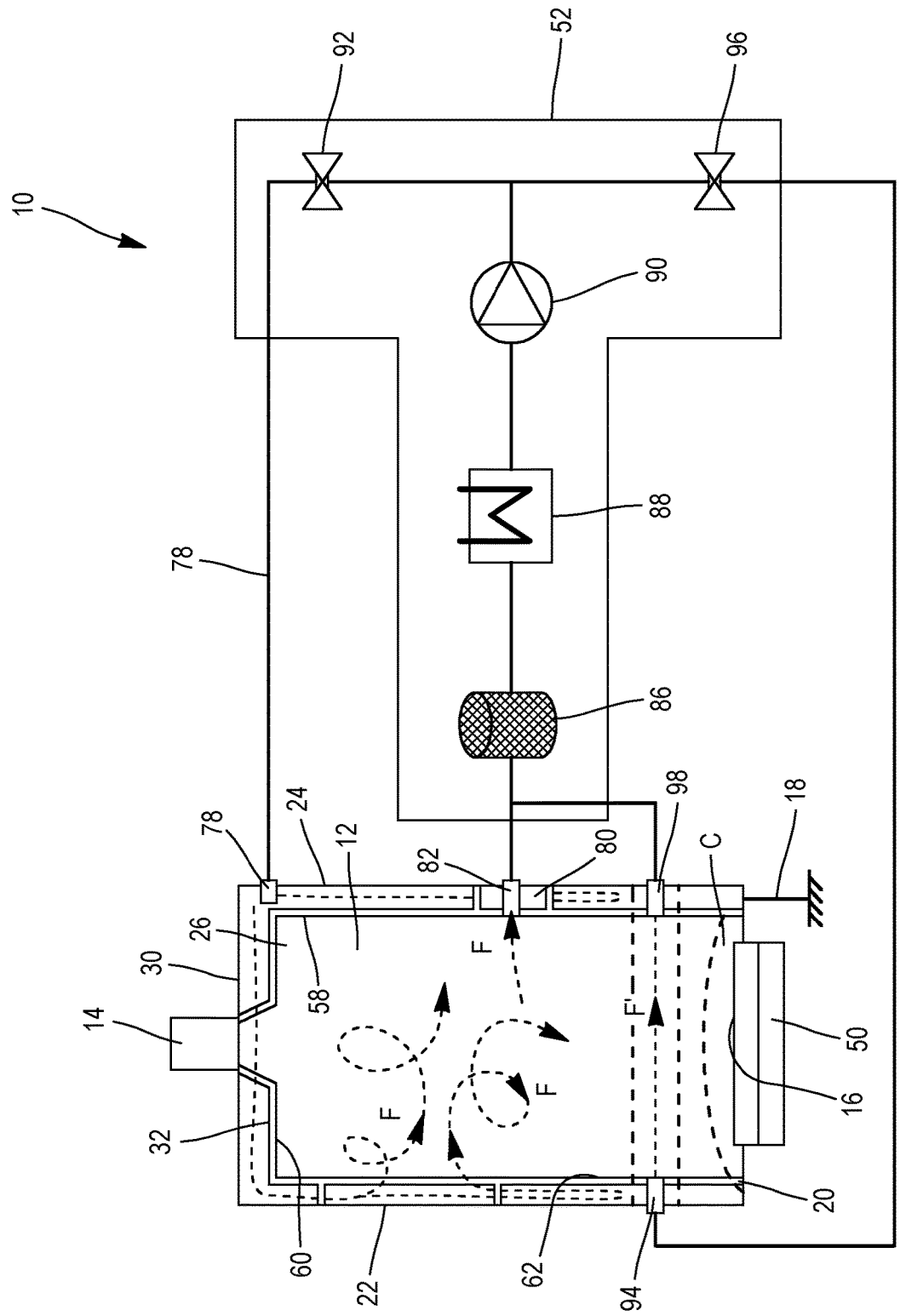
FIG. 1 is a schematic view of an additive manufacturing machine according to the invention.

The invention relates to an additive manufacturing machine 10 preferably using an additive manufacturing method by deposition of a bed of powder. Specifically, with such a manufacturing method, a large quantity of unconsolidated powder surrounds the manufactured components and thus a large amount of heat radiates from this powder when the manufacturing plate is heated or heats up.

The machine according to the invention can be used with additive manufacturing powder of the metal type, or the non-metal type which is based for example on ceramic.

In order to implement an additive manufacturing method, the additive manufacturing machine 10 comprises a manufacturing chamber 12 inside which at least one source of heat or energy 14 is used to melt the additive manufacturing powder on a working surface 16. The source(s) of heat or energy 14 may be a laser beam, a beam of electrons, and/or diodes. Preferably, this manufacturing chamber 12 is closed in a sealed manner during a manufacturing cycle and is filled with an inert gas, such as nitrogen or argon, to avoid the oxidation of the grains of powder.

This manufacturing chamber 12 is supported by a framework 18 and is formed by at least one working plane 20, a front wall 22, a rear wall 24, a left-hand lateral wall 26, a right-hand lateral wall 28, and an upper wall 30. Preferably, these walls are joined together in a sealed manner. In order to provide access to the interior of the manufacturing chamber 12 for maintenance or cleaning operations, the left-hand lateral wall 26 and the right-hand lateral wall 28 may take the form of doors that can be closed in a sealed manner. In parallel, and in order to allow an operator to see and access the interior of the manufacturing chamber 12 in order to recover the manufactured components for example, the front wall 22 comprises an opening 44 closed by a door 46, which is preferably transparent, and this front wall 22 is equipped with a glove box 48.

In the case of a manufacturing method involving deposition of a bed of powder, the working surface 16 takes the form of a plate 34 on which a plurality of layers of powder are spread. To this end, the machine 10 comprises an actuator 42, such as a cylinder, for raising and lowering the plate 34 inside a manufacturing sleeve 35 that is secured to the framework 18 of the machine 10 and opens onto the working plane 20. Moreover, the machine 10 also comprises at least one powder feeding device 36, for example having a slide, a powder spreading device 38, having a roller or a scraper for example, and a moving device 40, for example having pulleys and belts, for moving this spreading device 38 above the working surface 16 formed by the plate 34. Preferably, a powder feeding device 36 is provided on each side of the plate 34, and thus on each side of the working surface 16, along the length L10 of the machine.

In order to limit the occurrence of residual stresses in the manufactured components, the plate 34 is heated, for example to a temperature of 500° C. To this end, the plate 34 incorporates a heat production device, such as an electrical resistor or a heating rod or an inductor, or the machine 10 comprises a heating device 50 that produces heat and transfers it to the additive manufacturing plate, for example by conduction, the heating device 50 being side-by-side with the manufacturing plate 34, and for example fastened under this plate.

In order to protect at least one of the walls of the manufacturing chamber 12 that supports the source of energy or heat used to melt the additive manufacturing powder from the heat radiating from the working surface 16, the additive manufacturing machine according to the invention comprises an inner skin 32.

More specifically, this inner skin 32 is positioned inside the manufacturing chamber 12 in front of each wall of this chamber supporting the source of energy or heat 14 and at a non-zero distance from each wall of this chamber supporting the source of energy or heat. Thus, this inner skin 32 makes it possible to create a circulation volume V for a flow of gas between the inner skin 32 and each wall in front of which this inner skin is positioned.

In association with this circulation volume V, the machine 10 comprises a device 52 for generating a flow of gas F that is connected to the circulation volume V. By being introduced into the circulation volume V and flowing through this volume V, the flow of gas F makes it possible to cool the inner skin 32.

Preferably, the gas used to generate the flow F is the same gas as is used to render the manufacturing chamber 12 inert, such as argon or nitrogen.

In order also to be protected from the heat radiating from the working surface 16, the device 40 for moving the powder spreading device 38 is for its part also positioned behind the inner skin 32 in the circulation volume V of the flow of gas F.

The left-hand lateral wall 26 and the right-hand lateral wall 28 of the manufacturing chamber 12 may take the form of doors, and the source(s) of energy or heat 14 are preferably supported by the rear wall 24, the front wall 22 and the upper wall 30. Also, in order to protect these three walls from the radiating heat, the inner skin 32 takes the form of a tunnel extending between the left-hand lateral wall 26 and the right-hand lateral wall 28, at a non-zero distance D24 from the rear wall, at a non-zero distance D22 from the front wall, and at a non-zero distance D30 from the upper wall.

Figure 2:
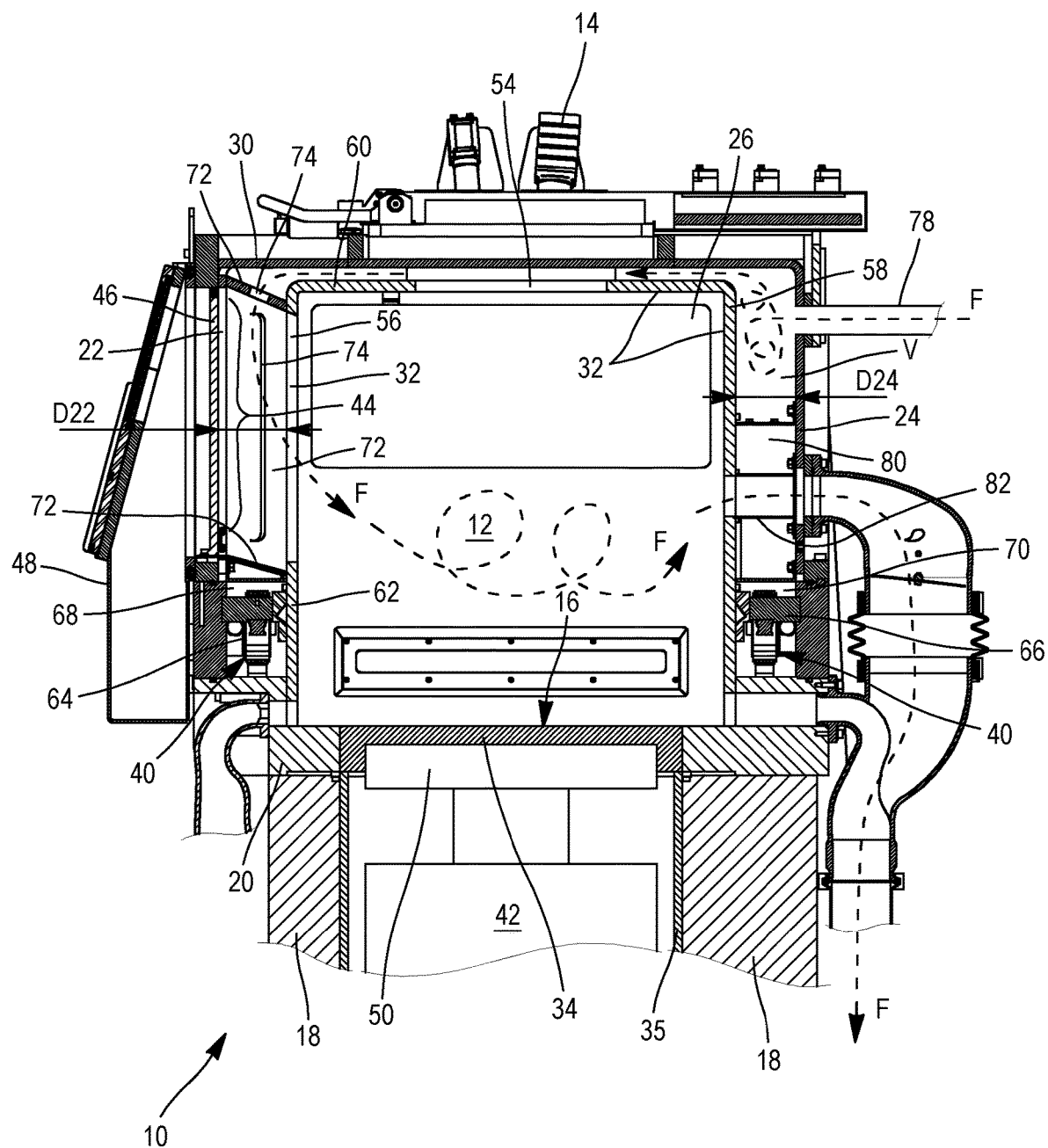
FIG. 2 is a view in cross section of an additive manufacturing machine according to the invention.
Figure 3:
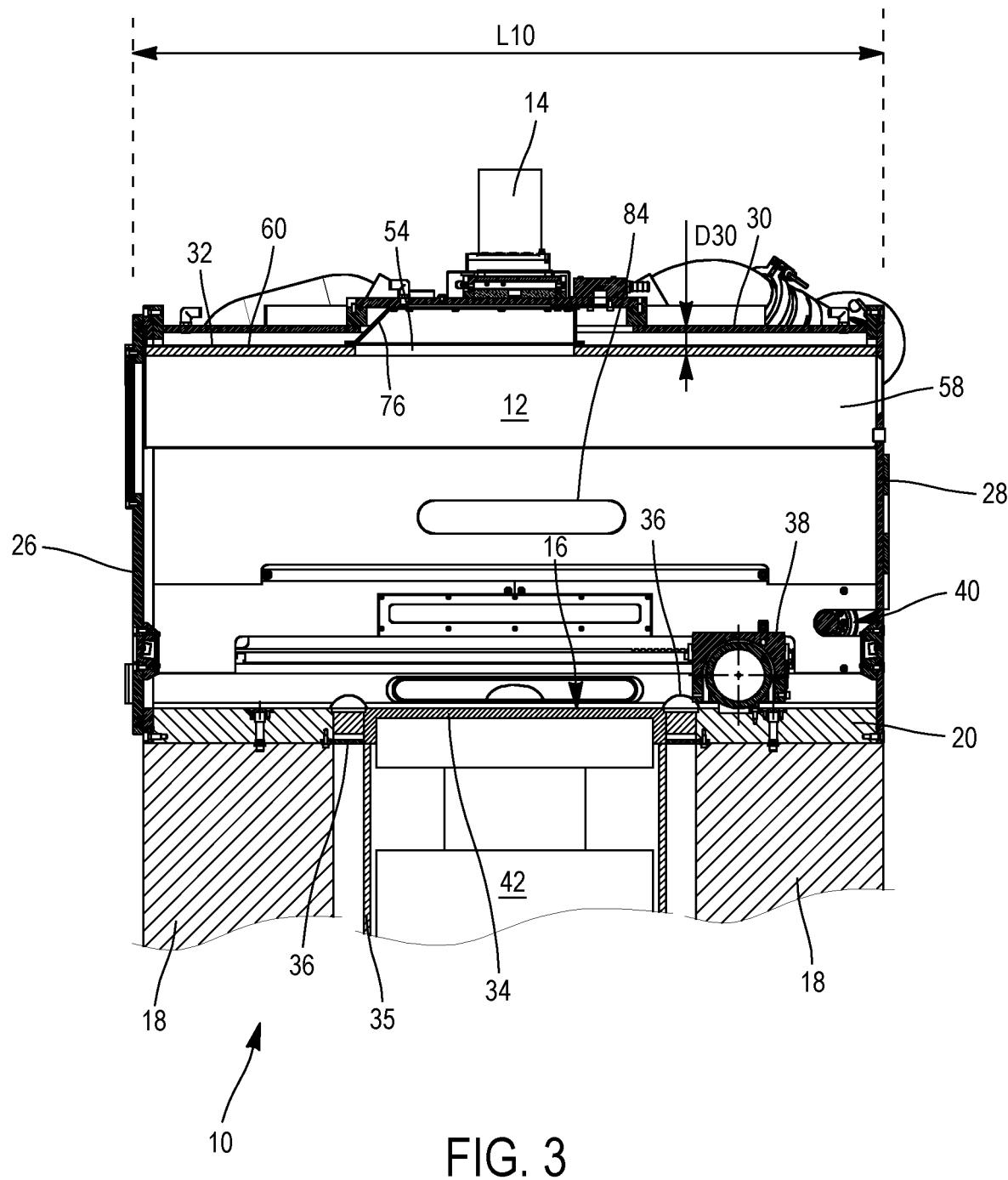
FIG. 3 is a view in longitudinal section of an additive manufacturing machine according to the invention.

More specifically, in the machine 10 illustrated in FIGS. 2 and 3, the upper wall 30 of the manufacturing chamber 12 holds the source(s) of energy or heat 14, and the means used to move the beam of energy or heat over the working surface 16. Thus, the inner skin 32 comprises an upper opening 54 provided in front of the source(s) of energy or heat 14. This upper opening 54 allows the passage of the beam of energy and/or heat used to melt the grains of powder.

Similarly, and since the front wall 22 of the chamber 12 comprises a main opening 44 closed by a door 46, the inner skin 32 comprises a frontal opening 56 provided opposite the main opening 44 in the front wall of the manufacturing chamber.

In a preferred embodiment, the inner skin 32 comprises a rear inner wall 58, an upper inner wall 60, and a front inner wall 62 that are joined together so as to form a tunnel, the rear inner wall 58 being positioned inside the manufacturing chamber 12 in front of the rear wall 24 of the manufacturing chamber, the upper inner wall 60 being positioned inside the manufacturing chamber in front of, and thus beneath, the upper wall 30 of the manufacturing chamber, and the front inner wall 62 being positioned inside the manufacturing chamber in front of the front wall 22 of the manufacturing chamber.

In this preferred embodiment, the front inner wall 62 comprises the frontal opening 56 provided opposite the main opening 44 in the front wall of the manufacturing chamber, and the upper inner wall 60 comprises the upper opening 54 for the passage of the beam of energy and/or heat.

Still in this preferred embodiment, with the device 40 for moving the powder spreading device 38 comprising a front device 64 and a rear device 66 for driving and guiding the spreading device 38 in translation, the front driving and guiding device 64 is positioned in a housing 68 situated between the front inner wall 62 of the inner skin and the front wall 22 of the manufacturing chamber, and the rear driving and guiding device 66 is positioned in a housing 70 situated between the rear inner wall 58 of the inner skin and the rear wall 24 of the manufacturing chamber. With the spreading device 38 moving over the working surface 16 situated in line with the working plane 20, the housings 68 and 70 are situated in the lower part of the manufacturing chamber 12 and thus in the lower part of the walls of the chamber and the inner skin. According to the invention, these housings 68 and 70 belong to the circulation volume V of the flow of gas F.

On account of the presence of the main opening 44 in the front wall of the manufacturing chamber and of the frontal opening 56 in the front inner wall 62 of the inner skin, a partition 72 connects the main opening 44 in the front wall of the manufacturing chamber to the frontal opening 56 in the front inner wall 62. Thus, the circulation volume V extends around this partition 72 between the front wall of the manufacturing chamber and the front inner wall 62 of the inner skin. In order to allow the flow of gas F to pass into the manufacturing chamber 12, this partition 72 comprises various holes 74 provided all around these openings 44, 56.

On account of the presence of the upper opening 54 in the upper inner wall 60 of the inner skin, a partition 76 connects the upper opening 54 to the upper wall 30 of the manufacturing chamber. Thus, the circulation volume V extends around this partition 76 between the upper wall 30 of the manufacturing chamber and the upper inner wall 60 of the inner skin.

On account of the presence of the main opening 44 in the front wall of the manufacturing chamber and of the frontal opening 56 in the front inner wall 62 of the inner skin and given that the upper wall 30 of the manufacturing chamber 12 holds the source(s) of energy or heat 14 and that the inner skin 32 comprises an upper opening 54 provided in front of the source of energy or heat 14, the invention preferably provides that the flow of gas F coming from the generating device 52 is introduced between the rear wall 24 of the manufacturing chamber 12 and the rear inner wall 58 of the inner skin. To this end, an introduction duct 78 connected to the device 52 for generating the flow of gas F opens into the rear wall 24 of the manufacturing chamber 12.

Preferably, with an electrical compartment 80, that is to say one intended to house various electrical cables, being provided between the rear wall 24 of the manufacturing chamber 12 and the rear inner wall 58 of the inner skin and above the housing 70 holding the rear driving and guiding device 66, the duct 78 opens out in the upper part of the rear wall 24 of the manufacturing chamber 12.

With the front inner wall 62 of the inner skin being open, the circulation volume V extends between the rear wall 24 of the manufacturing chamber and the rear inner wall 58 of the inner skin, then between the upper wall 30 of the manufacturing chamber and the upper inner wall 60 of the inner skin, then between the front wall 22 of the manufacturing chamber and the front inner wall 62 of the inner skin, finally opening out through the inner skin 32 and above the working surface 16, notably via the holes provided in the partition 72.

Defined in this way, the circulation volume V thus allows the flow of gas F to circulate between the rear wall 24 of the manufacturing chamber and the rear inner wall 58 of the inner skin, then between the upper wall 30 of the manufacturing chamber and the upper inner wall 60 of the inner skin, then between the front wall 22 of the manufacturing chamber and the front inner wall 62 of the inner skin, finally arriving on the inside of the inner skin 32 and above the working surface 16.

By virtue of the circulation volume V defined by the inner walls of the inner skin, the flow of gas F can thus effectively protect the three walls of the chamber supporting the source(s) of heat or energy 14 from heat.

In order to evacuate the flow of gas F that has circulated above the working surface 16 and has been heated up by the heat C radiating from this working surface 16, an intake duct 82 for the flow of gas F passes through the rear wall 24 of the manufacturing chamber and the rear inner wall 58 of the inner skin, before opening out through the inner skin 32 and above the working surface 16. More specifically, for a better intake of the flow of gas F, the intake duct 82 opens into the rear inner wall 58 of the inner skin in the form of a mouth 84 extending along the length L10 of the machine 10.

Preferably, the intake duct 82 passes through the electrical compartment 80.

In order to have a closed cooling circuit, the intake duct 82 is connected to the device 52 for generating the flow of gas F.

Between the intake duct 82 and the introduction duct 78, the generating device 52 preferably comprises a filtering device 86, since the melting of the powder generates numerous particles that are harmful to proper operation of the machine 10, and then a heat exchanger 88 for cooling the filtered gas, then a ventilator 90 for generating the cooled flow of gas F intended to be introduced between the walls of the manufacturing chamber 12 and the inner walls of the inner skin, and finally a valve 92 for closing the circuit.

Preferably, to ensure that the circulation volume V is filled properly, the flow of gas F is turbulent. To this end, the gas of the flow F is introduced into the circulation volume V at a speed of between 5 and 15 m/s and at a flow rate of between 100 and 300 m$^3$/h, the speed and the flow rate of the flow F varying between these values depending on the volume of the manufacturing chamber 12.

In parallel with the circuit of the flow of cooling gas F, the generating device 52 may also comprise a circuit of a second flow of gas F' intended to evacuate the fumes brought about by the melting during manufacturing. To this end, a duct 94 is connected to the ventilator 90 of the generating device 52 via a valve 96. This duct 94 passes through the lower part of the front wall 22 of the chamber 12 and the lower part of the front inner wall 62 of the inner skin 32 and opens at a low angle above the working surface 16 and inside the inner skin 32.

In order to have a closed fume evacuation circuit, another duct 98 is connected to the filter 86 of the generating device 52. This other duct 98 passes through the lower part of the rear wall 24 of the chamber 12 and the lower part of the rear inner wall 58 of the inner skin 32 and opens at a low angle above the working surface 16 and inside the inner skin 32.

Preferably, the flow of gas F' for evacuating fumes is laminar. To this end, the gas of the flow F' is introduced into the circulation volume V at a speed of between 1 and 5 m/s and at a flow rate of between 20 and 100 m$^3$/h, the speed and the flow rate of the flow F' varying between these values depending on the volume of the manufacturing chamber 12.

The invention claimed is:

1. An additive manufacturing machine comprising:
a manufacturing chamber inside which at least one energy source is used to melt additive manufacturing powder on a working surface, the manufacturing chamber being formed by at least one working plane, a front wall, a rear wall, a left-hand lateral wall, a right-hand lateral wall, and an upper wall, wherein the rear wall, the front wall and the upper wall are supporting walls which support the at least one energy source, and wherein the upper wall holds the at least one energy source;
an inner skin positioned inside the manufacturing chamber in front of each supporting wall at a non-zero distance from each supporting wall so as to create a circulation volume (V) for a flow of gas (F) between the inner skin and each supporting wall in front of which the inner skin is positioned, wherein the inner skin is in a form of a tunnel extending between the left-hand lateral wall and the right-hand lateral wall and comprises an upper opening provided in front of the at least one energy source, and wherein a partition connects the upper opening to the upper wall of the manufacturing chamber; and
a device for generating the flow of gas (F) that is connected to the circulation volume (V).

2. The additive manufacturing machine according to claim 1 further comprising:
a device for spreading additive manufacturing powder over the working surface; and
a device for moving the spreading device above the working surface,
wherein the moving device is positioned behind the inner skin in the circulation volume (V) of the flow of gas (F).

3. The additive manufacturing machine according to claim 1, wherein the front wall of the manufacturing chamber comprises a main opening closed by a door, and the inner skin comprises a frontal opening provided opposite the main opening in the front wall of the manufacturing chamber, and
wherein a second partition connects the main opening in the front wall of the manufacturing chamber to the frontal opening in the inner skin.

4. The additive manufacturing machine according to claim 1, wherein the inner skin comprises a rear inner wall, an upper inner wall, and a front inner wall that are joined together so as to form the tunnel, the rear inner wall being positioned inside the manufacturing chamber in front of the rear wall of the manufacturing chamber, the upper inner wall being positioned inside the manufacturing chamber beneath the upper wall of the manufacturing chamber, and the front inner wall being positioned inside the manufacturing chamber in front of the front wall of the manufacturing chamber.

5. The additive manufacturing machine according to claim 4, wherein the flow of gas (F) coming from the generating device is introduced between the rear wall of the manufacturing chamber and the rear inner wall of the inner skin.

6. The additive manufacturing machine according to claim 5, wherein the front inner wall of the inner skin is open, and
wherein the circulation volume (V) extends between the rear wall of the manufacturing chamber and the rear inner wall of the inner skin, extends between the upper wall of the manufacturing chamber and the upper inner wall of the inner skin, extends between the front wall of the manufacturing chamber and the front inner wall of the inner skin, and opens out through the inner skin and above the working surface.

7. The additive manufacturing machine according to claim 4 further comprising:
an intake duct, for the flow of gas (F), which passes through the rear wall of the manufacturing chamber and the rear inner wall of the inner skin, before opening out through the inner skin and above the working surface.

8. The additive manufacturing machine according to claim 7, wherein the intake duct is connected to the device for generating the flow of gas (F).

9. The additive manufacturing machine according to claim 8, wherein the device for generating the flow of gas (F) comprises a heat exchanger for cooling gas drawn in via the intake duct.

* * * * *